United States Patent [19]
Bedi et al.

[11] Patent Number: 5,443,138
[45] Date of Patent: Aug. 22, 1995

[54] UNIVERSAL SANDWICH ADAPTER AND THREADED NIPPLE FOR ATTACHING SAME

[75] Inventors: Ram D. Bedi; Adrianus J. van der Griendt, both of Bloomfield Hills, Mich.

[73] Assignee: K.J. Manufacturing Co., Wixom, Mich.

[21] Appl. No.: 226,709

[22] Filed: Apr. 12, 1994

[51] Int. Cl.[6] ............................................. F16C 3/14
[52] U.S. Cl. .................................. 184/1.5; 123/196 R
[58] Field of Search ..................... 184/1.5; 123/196 R

[56] References Cited

U.S. PATENT DOCUMENTS

| | | |
|---|---|---|
| 1,766,847 | 6/1930 | Tibbets . |
| 2,394,236 | 2/1946 | Eastman . |
| 3,387,621 | 6/1968 | Schaff . |
| 3,448,746 | 6/1969 | Butler . |
| 4,193,442 | 3/1980 | Vian . |
| 4,239,184 | 12/1980 | Dudar . |
| 4,369,110 | 1/1983 | Picek . |
| 4,433,656 | 2/1984 | Norwood, Sr. . |
| 4,452,695 | 6/1984 | Schmidt . |
| 4,479,468 | 10/1984 | Norwood, Sr. . |
| 4,745,894 | 5/1988 | Laipply et al. . |
| 4,940,209 | 7/1990 | Fish . |
| 4,951,784 | 8/1990 | Bedi . |
| 4,967,776 | 11/1990 | Folmar . |
| 4,976,233 | 12/1990 | Bedi et al. . |
| 5,044,334 | 9/1991 | Bedi . |
| 5,048,578 | 9/1991 | Dorf et al. . |
| 5,062,398 | 11/1991 | Bedi et al. . |
| 5,074,380 | 12/1991 | Bedi et al. . |
| 5,090,376 | 2/1992 | Bedi . |
| 5,094,201 | 3/1992 | Bedi . |
| 5,122,020 | 6/1992 | Bedi . |
| 5,145,033 | 9/1992 | Bedi et al. . |
| 5,154,775 | 10/1992 | Bedi . |
| 5,209,198 | 5/1993 | Bedi . |
| 5,236,064 | 8/1993 | Wagoner . |
| 5,327,862 | 7/1994 | Bedi . |

FOREIGN PATENT DOCUMENTS 55-109714  8/1980  Japan .

Primary Examiner—Thomas E. Denion
Attorney, Agent, or Firm—Basile and Hanlon

[57] ABSTRACT

A two-part oil filter mounting adapter for use with internal combustion engines. The filter mounting adapter includes a universal sandwich adapter and a nipple adapter that engages with a filter mounting boss at one end and an oil filter unit at the other end. The sandwich adapter has a passage along an outside wall for a fluid coupling assembly that is capable to be releasably connected to a suitable fluid supply hose. The sandwich adapter is rotatably mounted on a hub of the nipple adapter so that the passage is positionable to any direction.

5 Claims, 2 Drawing Sheets

UNIVERSAL SANDWICH ADAPTER AND THREADED NIPPLE FOR ATTACHING SAME

FIELD OF THE INVENTION

This invention relates to a device for use in conjunction with an oil filter to facilitate rapid cleaning and oil change of an associated engine.

BACKGROUND OF THE INVENTION

The necessity of routine oil changes for the trouble-free operation of an automotive vehicle is well documented. Such maintenance is one of the most cost-effective measures which can be taken toward preserving and prolonging the useful life of an internal combustion engine. Such measures reap additional rewards in the environmental arena as it is also well documented that proper engine maintenance can positively effect vehicle emissions and the like.

Unfortunately, the process of changing engine oil can be both time-consuming and messy. Thus, it is not considered a highly pleasant activity and, as such, is likely to be postponed or ignored to the detriment of the internal combustion engine. In fleet vehicles routine maintenance such as scheduled oil changes may be mandated by fleet operations. While this may ensure that the vehicles are routinely service, it does nothing to reduce or eliminate the time and mess involved in oil change operations. These problems are costly to the fleet owner both in terms of down-time and the necessity to ensure that the oil change procedures and spent oil generated therefrom is conducted and disposed of in an environmentally sound manner.

In previous patents, the present inventor has proposed methods whereby oil change operations can be accomplished in a unified, essentially spill-free manner.

In U.S. Pat. No. 5,145,033, the inventor disclosed a sandwich adapter which could be interposed between the engine oil filter and the oil filter mounting boss present on the internal combustion engine to permit removal of engine oil present in the oil filter and to permit introduction of purge gas and flushing fluid through the adapter into the internal lube oil passage system of the internal combustion engine to accomplish removal of residual oil and contaminants from this region. The adapter disclosed therein had a first face adapted to sealingly contact and surround the openings in the internal lube oil passage system which communicated with the filter mounting boss and a second face adapted to sealingly connect with the oil filter unit. The sandwich adapter included a nipple extending through a central through bore in the adapter. The nipple was specifically modified to include a plurality of apertures to facilitate fluid flow from an inlet channel communicating with the exterior of the adapter into the center of the nipple and on to the internal lube oil distribution passages as well as through the filtration media contained in the attached oil filter unit. The flush fluid passing through the oil filter unit progressed in a counter current fashion and was conveyed out of the circuit by a suitable exit line also in fluid communication with the sandwich adapter. While this device and the method disclosed address some of the problems inherent in oil change procedures, the device as disclosed, in some instances was found to be cumbersome to use, particularly in situation in which oil change without reverse (counter current) flush cleaning of the oil filter is all that is required. The adapter was configured to permit removal of residual oil contained in the filter during an oil change operation and to permit introduction of flush fluid there through. The orientation of the inlet and outlet openings as well as the necessary hoses associated therewith makes universal adoption of the sandwich adapter disclosed therein difficult, time consuming and cumbersome due to the space constraints found in many engine configurations.

Other devices have been proposed which address different aspects of the oil change procedure. U.S. Pat. No. 4,433,656 to Norwood discloses an automotive oil filter precharging arrangement which included an adapter interposed between the oil filter and the oil filter mounting boss located on the internal combustion engine. The adapter included a mounting plate, a threaded nipple received in a central through bore onto which the oil filter unit can be attached, and a threaded plug received within a single threaded port in fluid communication with one of the inlet holes also located in the mounting plate. In operation, after a new filter has been attached to the mounting plate, the threaded plug is removed and a small quantity of the fresh oil required in an oil change operation is fed in a non-automated fashion into the oil filter by a funnel, spout, oil pump gun or the like. After the oil filter is charged with oil, the threaded plug must be manually replaced. The oil in the filter was readily available to the engine upon start-up to minimize engine wear.

The Norwood reference does not address the remaining portions of the oil change procedure. Major drawbacks to the process disclosed in the Norwood reference include: (a) the cumbersome nature of the charging process and the risk of oil spillage during oil introduction; and (b) the mounting adapter disclosed in the Norwood reference would be difficult to use in engines having tight clearances and other orientation and space constraints. In order to achieve free orientation of the Norwood adapter relative to the engine, it would be necessary to replace the existing mounting boss nipple with the nipple disclosed in the Norwood reference. In many instances, the mounting boss nipple is permanently or nearly permanently mounted of the existing nipple on the engine. In such instances a device such as the Norwood adapter would be difficult, if not impossible to successfully employ.

In U.S. Pat. No. 4,909,205 to Bewley, a method and apparatus for changing engine oil is disclosed in which a cylindrical adapter is mounted in fluid contact with the internal combustion engine of a vehicle. The cylindrical adapter disclosed in Bewley is connected to flexible hoses which have male portions of quick connect coupling members at their extremities. The quick connect hoses connect to two mating coupling members located on a second mount separate from the cylindrical adapter to which the oil filter unit is connected. The cylindrical mounting adapter carries a motor-driven reversible-action pump which is connected by a flexible hose to the bottom of the engine oil pan. When the second mount is connected with a suitable plastic container reservoir and the adapter mounted pump is energized, spent oil is removed from the engine to the plastic container. Once the spent oil is removed, a new plastic container filled with fresh oil can be connected and the pump direction reversed to permit replacement of the removed spent oil with fresh engine oil. The method and apparatus are cumbersome and provide several opportunities for oil spillage and the like.

To date, none of the proposed devices provide for an efficient and cost-effective means to manufacture and supply spill-free oil removal devices for an internal combustion engine. It would be desirable to provide a convenient, environmentally safe, no-mess alternative to conventional oil changes which reduces the time and labor required in the process and reduces the chances for oil spillage before, during and after the oil change operation. It is also desirable to provide an oil filter mounting adapter which can be successfully employed in complete oil change operations. It is desirable that the mounting adapter provides an access to the unfiltered oil side of the filter for providing a more complete and an improved oil change. It is further desirable that the mounting adapter provides convenient access for automatic oil changes; and does not interfere with oil filter replacement. Finally, it is desirable to provide an apparatus which is economical to manufacture and can be readily employed on internal combustion engines of varying configurations with minimal change to the engine design or operation.

SUMMARY OF THE INVENTION

The present invention addresses the aforementioned concerns. The present invention is a device for facilitating rapid oil change and optional high speed flush cleaning of any mechanism having a system for lubricating its moveable parts and an associated lube oil filtration system. It is contemplated that the present invention can be successfully, rapidly, and advantageously employed in conjunction with an internal combustion engine having a crankcase and an oil pan. It is further contemplated that the invention provides a cost-effective means to equip a variety of engine configurations with a rapid oil change device.

The apparatus of the present invention generally comprises a two-part oil filter unit mounting adapter which is connected to the internal combustion engine via a filter mounting boss. The mounting adapter is specifically configured to support automated oil change operations. The filter mounting adapter is suitably configured to permit the sealing, releasable attachment of a suitable oil filter unit thereto. The two-part filter mounting adapter is connected to the engine in a manner which establishes fluid communication between the lube oil distribution passages located in the internal combustion engine and the oil filter unit, thereby communicates between the unfiltered oil from the oil pump at one end and the filtered oil going to the oil passages at the other end. The two-part oil filter mounting adapter includes a universal sandwich adapter and a nipple adapter. The universal sandwich adapter is capable of being used by a variety of engine configurations, while the nipple adapter is distinct for a particular engine configuration and effects operative compatibility between the universal sandwich adapter, the engine and the oil filter. The nipple adapter sits within a central bore of the universal sandwich adapter so that the sandwich adapter is resting about a hub of the nipple adapter. The nipple adapter has a threaded first end for engagement with the oil filter unit and an internally threaded second end for engagement with the existing engine filter nipple.

The universal sandwich adapter has a first face adapted to sealingly contact the filter mounting boss on the internal combustion engine block. The sandwich adapter also has a second face adapted to sealingly connect with the oil filter unit. The sandwich adapter conveys engine oil through the oil filter unit and back into the lube oil distribution passages during normal engine operation. The adapter also includes means for introducing fluid through the sandwich adapter on the unfiltered side of the internal combustion engine via the lube oil distribution passages.

The two-part adapter preferably permits a spin-on installation and is adapted to be positionable on the filter mounting boss assembly already located on the internal combustion engine. Preferably, the sandwich adapter member is sealingly positionable on the oil filter mounting boss by spinning the nipple adapter into sealing engagement with the oil filter mounting boss. Once installed, the two-part adapter provides convenient access for automatic oil changes; and the adapter does not interfere with oil filter replacement, which remains essentially unchanged.

In the preferred embodiment of the present invention, the fluid introduction means in the sandwich adapter has complete rotational flexibility about the hub of the nipple adapter to enable variations of its orientation depending upon the engineering dimensions and the location of the filter mounting boss in the engine compartment and the space constraints encountered. This rotational flexibility assures easy and convenient access to the fluid introduction port.

The two-part oil filter mounting adapter may include a quick connect assembly located in a fluid inlet passage conveniently positioned when the sandwich adapter is in position to permit introduction of fluid into and through the mounting adapter. The quick connect assembly permits positive closure of the fluid introduction inlet when it is not in use. The quick connect assembly is configured to releasably engage a mating fitting connected to an external fluid source.

The present invention provides an expedient and efficient means for purging old fluid and contaminants from the oil filter element and the oil passages of the lubricating system into the oil pan, by introducing an amount of a pressurized gaseous means, preferably air, via the inlet in the oil filter mounting adapter.

Once spent oil has been removed, the oil filter unit can be replaced, if necessary, and an amount of fresh oil can be introduced at will in an automated fashion into the engine through the two-part oil filter mounting adapter. The fluid thus introduced first flows through and charges the oil filter element of the internal combustion engine. The filtered oil then passes through the lubricating passages prior to accumulating in the oil pan reservoir. It has been established that engine wear is greatly reduced by having the oil filter charged and the engine pre-lubricated before starting the engine.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
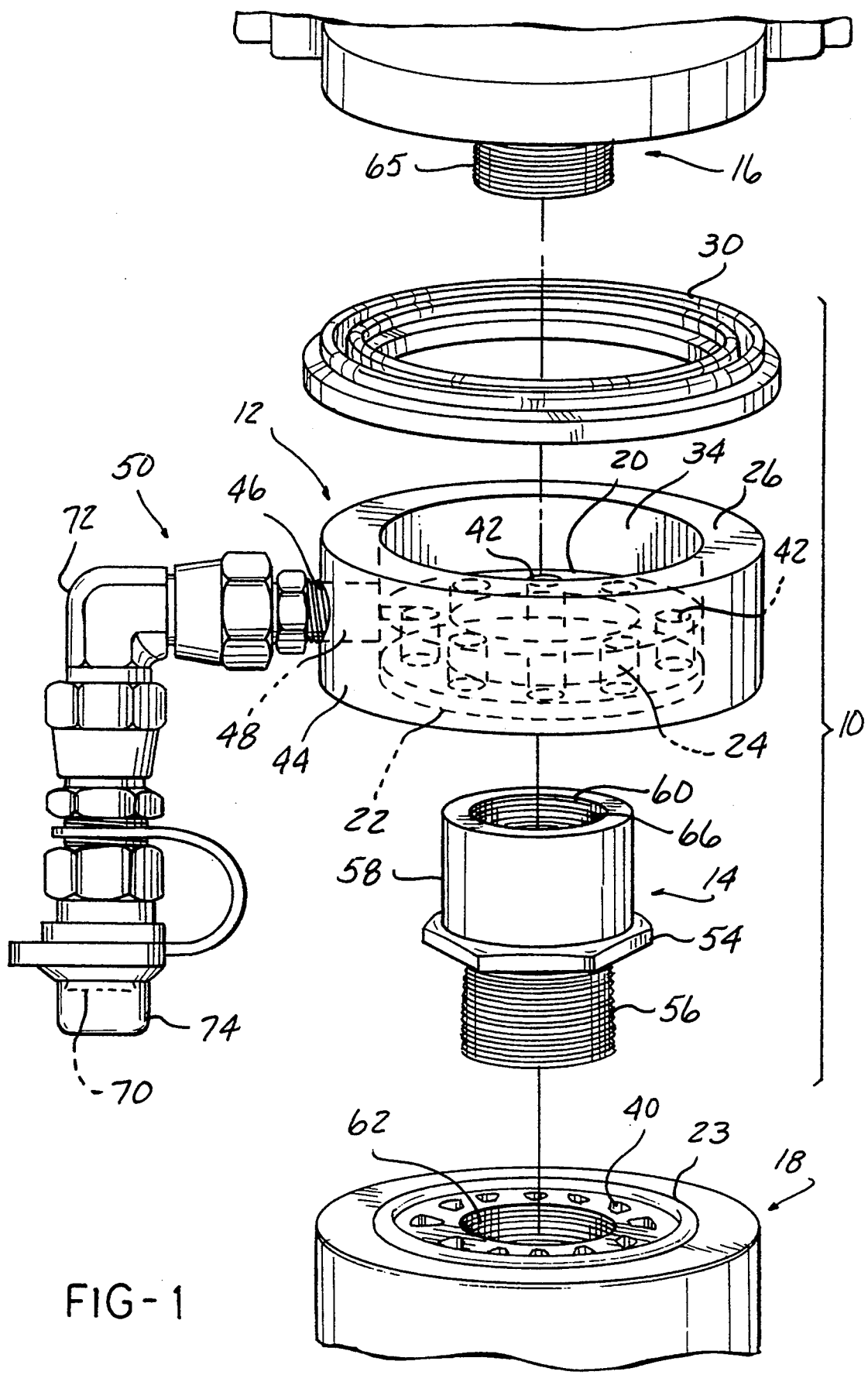
FIG. 1 is an exploded view of the sandwich adapter and nipple adapter of the two-part oil filter mounting adapter of the present invention showing a portion of the associated boss and suitable oil filter.

Referring to FIGS. 1-4, the apparatus of the present invention includes a two-part oil filter mounting adapter 10 which is able to be mounted on an internal combustion engine (not shown) so as to establish fluid communication between the internal lube oil distribution passage system located in the engine and the two-part mounting adapter 10. The mounting adapter 10 provides a connection between unfiltered oil from the passage going into a filter 18 and filtered oil going into the oil passages of the engine. The two-part oil filter mounting adapter comprises a sandwich adapter 12 and a nipple adapter 14. The mounting adapter 10 may be mounted directly to a mounting boss configured in the engine block 16. The two-part oil filter mounting adapter 10 is configured so as to be readily mounted in the position for receiving an oil filter unit 18 directly in a manner which will be discussed in detail subsequently.

Figure 3:
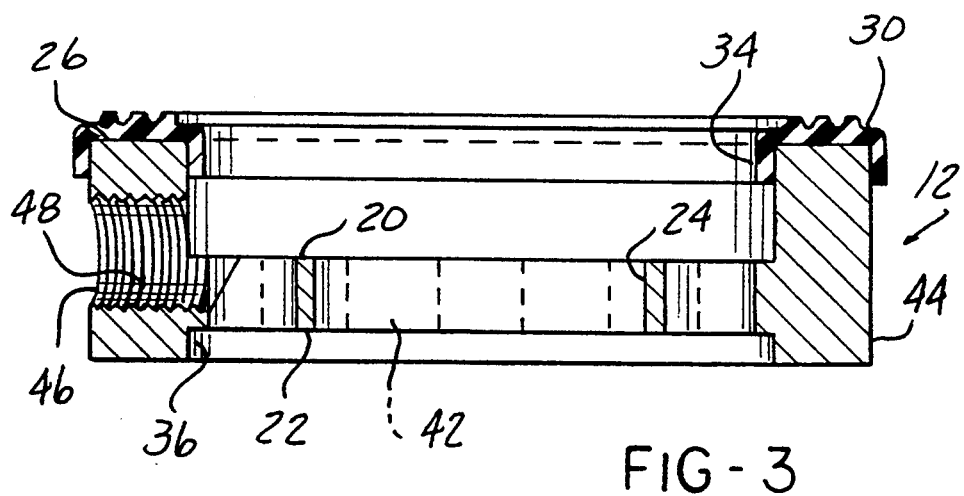
FIG. 3 is a detailed cross-sectional view of the sandwich adapter.
Figure 4:
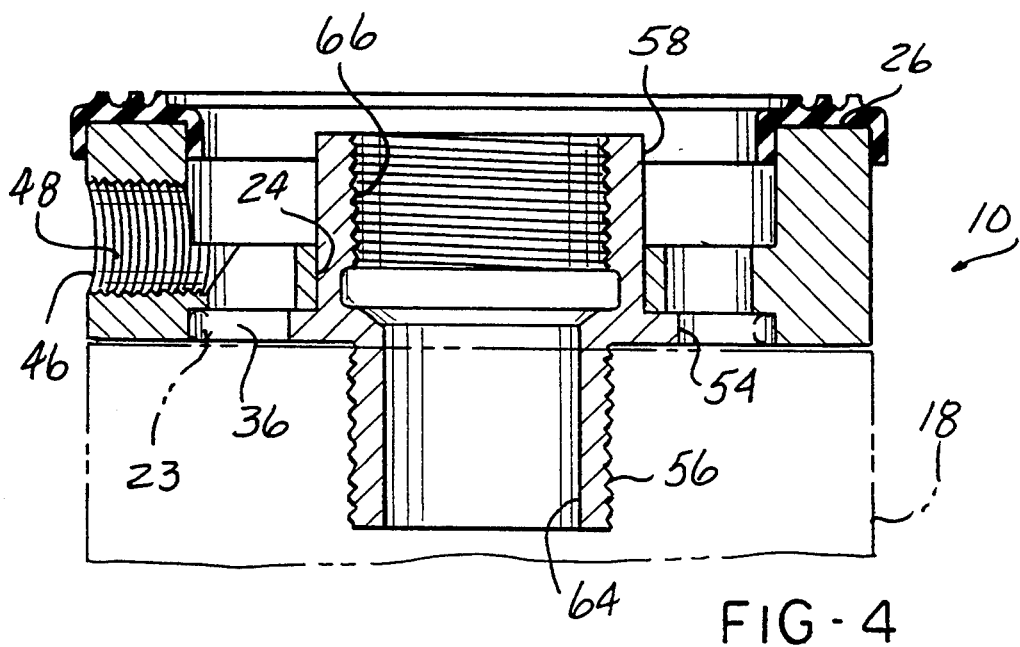
FIG. 4 is a detailed cross-sectional view of the nipple adapter in engagement with the sandwich adapter to form the two-part oil filter mounting adapter.

The sandwich adapter 12 generally has a first engine oriented face 20, a second face 22, opposed and parallel to the first face 20, and a central through bore 24 extending through the sandwich adapter 12 from the first face 20 to the second face 22. The second face 22 is oriented toward a suitable oil filter unit 18 which is removably and sealingly attached to the two-part oil filter mounting adapter 10. A sealing gasket 23 on oil filter unit 18 provides a sealing means between the sandwich adapter 12 and oil filter unit 18. The first engine oriented face 20 may have an outer annular face 26 extending along its outer periphery. The outer annular face 26 includes sealing means between the engine mounting boss assembly 16 and the two-part mounting adapter 10. The sealing means comprises a sealing gasket such as a sleeve 30 extending along the annular face 26 as shown in FIGS. 3 and 4.

The sandwich adapter 12 preferably has a main fluid collection chamber defined therein. This main collection chamber includes an upper collection chamber 34 located in the first engine oriented face 20 interior to the annular face 26 and a lower fluid collection chamber 36 located on the second filter oriented face 22 of the sandwich adapter 12.

The upper collection chamber 34 is in fluid communication with an oil distribution channel which conveys unfiltered oil from the oil pump, generally located in the interior of an oil pan, to the oil filter unit 18. The oil collection chamber 34 may have any configuration suitable to facilitate the conveyance of engine oil to be filtered into the oil filter unit 18. The lower collection chamber 36 located in the second filter oriented face 22 is adapted to overlay oil inlet apertures 40 located in the oil filter unit 18. Interposed between the two collection chambers are a plurality of apertures 42 positioned radially around the sandwich adapter 12 and extending through the sandwich adapter 12 from the first face 20 to the second face 22 connecting chamber 36 to chamber 34.

The sandwich adapter 12 also has an outer wall 44 perpendicular to and contiguous with the first face 20 and second face 22; and having an aperture 46 defined in a spaced relation therein. Said aperture 46 communicates with the upper collection chamber through a passage 48 that extends essentially perpendicular relative to outer wall 44 and is oriented between and parallel to the first and second faces 20, 22 of sandwich adapter 12. Passage 48 is in fluid communication with the radially spaced apertures 42. In the preferred embodiment, said aperture 46 has an internally threaded inner surface adapted to threadingly engage the outer surface of a fluid coupling fitting assembly 50. Prior to installation on the engine mounting boss 16, the fluid coupling assembly 50 may be separate from the sandwich adapter 12 to facilitate installation.

The nipple adapter 14, preferably a steel material, has a stepped outer surface 52 with an annular flange 54 dividing the stepped outer surface 52 into two portions; a first portion 56 having an outer threaded surface, and a second portion 58 having a generally smooth or unthreaded surface. The annular flange 54 may be any shape, but is preferably hexagonal and having a sufficient width and depth to accommodate a standard hex driver or other appropriate removal tool. The second unthreaded surface portion 58 of the nipple adapter 14 is adapted to be received through the central through bore 24 of the sandwich adapter 12, and thereby form a hub 58 for the sandwich adapter 12. The hub 58 extends into central through bore 24 until the flange 54 abuts the lower fluid collection chamber 36. The first threaded surface portion 56 of the nipple adapter 14 is threadingly engageable to a central threaded aperture 62 of the associated oil filter unit 18.

Figure 2:
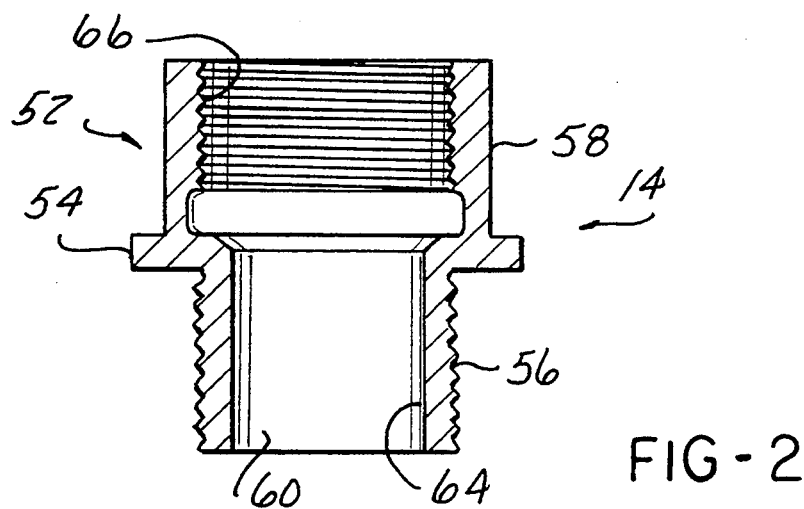
FIG. 2 is a detailed cross-sectional view of the nipple adapter.

Referring to FIG. 2, the nipple adapter 14 also has an inner central bore 60 divided into two sections. The central inner bore 60 provides an oil exit opening proximate to the oil filter unit 18. The first section 64, adjacent to the first threaded outer surface portion 56, has an unthreaded inner surface. The second section 66, adjacent to the second outer surface portion 58, has an inner threaded surface. Threaded section 66 threadably engages with downwardly extending member 65 of the engine mounting boss assembly 16.

The nipple adapter 14 is designed so that it is unique to specific engine configurations. At the same time it is designed to assemble with the universal sandwich adapter 12 which can be used on various engine configurations. The first portion outer surface 56 of the nipple adapter 12 is sized so that it threadably engages into the oil filter 18. The second outer portion surface or hub 58 of the nipple adapter 14 is dimensioned to slidingly engage into the central through bore 24 of the universal sandwich adapter 12. The second section 66 of the interior bore 60 of nipple adapter 14 is dimensioned to threadingly engage to threaded member 65 of the mounting boss assembly 16 for a particular engine configuration. When the second portion outer surface 58 of the nipple adapter 14 is slidingly engaged in the central through bore 24 of the sandwich adapter 12, there is enough clearance between outer surface 58 of the nipple adapter 14 and the inner surface of bore 24 of the sandwich adapter 12 to allow the sandwich adapter 12 to rotate about the hub 58 of nipple adapter 14.

In this manner, the oil filter mounting adapter 10 of the present invention can be installed permanently or semi-permanently on various engines, even those where extremely tight space constraints exist in the engine compartment. Because the oil filter mounting adapter 10 of the present invention exists as two parts, the sandwich adapter 12 can be rotated about hub 58 until aperture 46, into which the fluid coupling assembly 50 should be inserted, is positioned for easy access.

During normal engine operation, the fluid coupling assembly 50 provides a fluid tight seal which prevents the egress of engine oil from the sandwich adapter 12. During oil change and optional engine flush cleaning operations, the fluid coupling assembly 50 has a first end threadingly and sealably engageable with the threaded region of aperture 46. A distal end of the fluid coupling assembly 50 includes a means to releasably connect the assembly 50 to a suitable fluid supply hose. In the preferred embodiment, the means to releasably connect assembly 50 to an external hose a quick connect nipple 70 (in phantom). In addition, the fluid coupling assembly 50 may include at least one elbow adapter 72 to accommodate the angular orientation of the fluid coupling assembly 50. A removable dust cap 74 may also be included to provide protection means to quick connect nipple 70.

After spent oil is removed from the oil pan, an appropriate amount of fresh motor oil can be introduced in an automated fashion into the engine through the conveniently located oil fitting adapter 50 of the two-part oil filter mounting adapter 10 by means of a suitable fill hose which can be releasably connected to the fitting assembly. Because the two-part oil filter mounting adapter 10 is in fluid communication with the internal lube oil distribution passage system of the engine, the fresh oil thus introduced passes through the machined passages in the internal lube oil distribution system to lubricate even remote hard to reach surfaces of the moveable engine parts with fresh oil which has passed through the oil filter unit. The introduced oil which collects in the bottom of the oil pan is the appropriate quantity for recirculation through the lube oil distribution passage system when the engine is running and the lube oil is recirculating.

In this manner, an internal combustion engine can be easily, effectively and conveniently retrofitted to permit efficient, economical and environmentally-safe oil change and optional engine cleaning operations to be accomplished.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An oil filter mounting adapter connectible with a boss having an opening to an internal lube oil passage system and an oil filter unit of an engine, said oil filter mounting adapter comprising:
   a sandwich adapter and a nipple adapter;
   said nipple adapter comprising an outer surface wherein said outer surface is divided into two portions;
   a first portion having an outer threaded surface and a second portion having an unthreaded surface, said first portion adapted to threadably attach to the oil filter unit;
   a means for matingly connecting with the boss;
   said nipple adapter having a central inner bore providing an oil exit opening proximate to the oil filter unit; and
   said sandwich adapter comprising a first face adapted to sealingly contact the engine and to overlay the opening to the internal lube oil passage system, a second face adapted to sealingly connect to said oil filter unit;
   said sandwich adapter having at least one engine oil entry opening in proximity to the opening to the internal lube oil passage system, a means for introducing and removing fluids through said sandwich adapter, a central through bore extending laterally through said sandwich adapter from said first face to said second face, said central through bore adaptable for receiving said second portion of said nipple adapter therethrough wherein said second portion of said nipple adapter is disposed between and adjacent said boss and said sandwich adapter, and said second portion defines a hub about which said sandwich adapter is rotatably mounted.

2. The oil filter mounting adapter described in claim 1, wherein the nipple adapter further comprises:
   a first section in the central inner bore adjacent to the first outer surface portion; and
   a second threaded section in the central inner bore adjacent to the second outer surface portion, wherein said threaded section of the central inner bore is adapted to threadably attach to an opening to the internal lube oil passage system.

3. The oil filter mounting adapter described in claim 2, wherein the nipple adapter further comprises an annular flange on the outer surface, wherein said annular flange is disposed between the first outer portion and the second portion.

4. The annular flange of claim 3, wherein said flange is hexagonal.

5. An oil filter mounting adapter connectible with a threaded engine mounting boss having an opening to an internal lube oil passage system and an oil filter unit of an engine, said oil filter mounting adapter comprising:
   a sandwich adapter and a nipple adapter;
   said nipple adapter comprising an outer surface wherein said outer surface is divided into two portions;
   a first portion having an outer threaded surface and a second portion having an unthreaded surface and a predetermined axial length, said first portion adapted to threadably attach to the oil filter unit;
   a means for matingly connecting with the engine mounting boss;
   an annular flange on the outer surface, wherein said flange divides the first outer portion and the second portion;
   said nipple adapter having a central inner bore providing an oil exit opening proximate to the oil filter unit;
   said central inner bore having an unthreaded section adjacent to the first outer surface portion, and a threaded section adjacent to the second outer surface portion;
   said sandwich adapter comprising a first face adapted to sealingly contact the engine a second face adapted to sealingly connect to said oil filter unit, and an outer wall disposed between said first and said second faces and perpendicularly attached thereto; and said sandwich adapter having at least one engine oil entry opening in proximity to the opening to the internal lube oil passage system, at least one oil collection chamber proximate to said engine mounting boss, a plurality of fluid transfer channels extending laterally through said oil collection chamber, a means for introducing and removing fluids through said sandwich adapter, an aperture positioned in said outer wall, a central through bore extending laterally through said sandwich adapter from said first face to said second face, said central through bore adaptable for receiving said second portion of said nipple adapter therethrough, wherein said second portion of said nipple adapter is disposed axially between and adjacent said threaded mounting boss and said sandwich adapter, and said second portion defines a hub about which said sandwich adapter is rotatably mounted.

* * * * *